July 5, 1932.     H. W. HILL     1,865,691

LENS

Filed April 11, 1928

Inventor

Harry W. Hill.

By Harry H. Styll.

Attorney

Patented July 5, 1932

1,865,691

UNITED STATES PATENT OFFICE

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

LENS

Application filed April 11, 1928. Serial No. 269,224.

This invention relates to improvements in lenses and has particular reference to an improved process for making a multicolored lens and to an improved blank for such a lens.

The principal object of the invention is to provide an improved process for manufacturing a lens of a plurality of pieces of glass of different color.

Another object of the invention is to provide an improved process for manufacturing a lens having a variation in shade that progressively increases in density or depth of color.

Another object of the invention is to provide an improved process for making a lens that has one portion of the lens clear or colorless and another portion of the lens having color of increasing depth or density.

Another object of the invention is to provide an improved lens blank for the manufacture of lenses of this character.

Other objects and advantages of the invention will be apparent from the following description taken in connection with the accompanying drawing, and it will be apparent that many changes may be made in the order of the steps of the process and arrangement of parts without departing from the spirit of the invention as expressed in the accompanying claims. I, therefore, do not wish to be limited to the exact steps and details shown and described as the preferred forms only have been shown by way of illustration.

Referring to the drawing.

Hitherto the production of multi-colored lenses, that is, lenses having portions of different color or shade, has involved considerable difficulties and expense. It has been the practice of fusing together throughout their face surfaces glasses of different color or flashing the glass by blowing different colors together one layer on the other and thereafter grinding and polishing the lens to suitable contour and surface characteristics. In addition to the expense involved there has been difficulty in obtaining the required density of shade and the arrangement of one shade with respect to the other, particularly the merging of one shade into the other.

It is, therefore, the prime object of my invention to provide a simple, efficient and economical process of manufacturing such a lens and an improved lens blank for the same in which the cost of production is greatly reduced and also the waste of glass or material reduced to a minimum.

Figure 1:
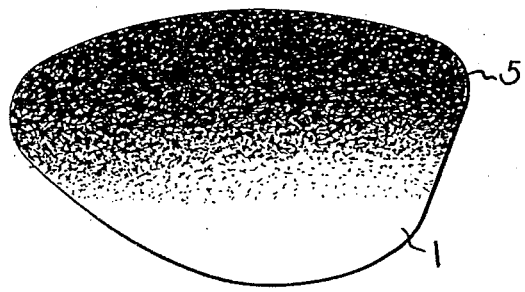
Fig. 1 is a front view of a finished lens embodying the invention.
Figure 2:
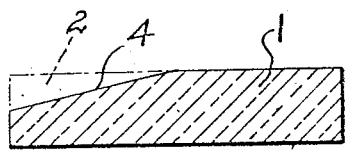
Fig. 2 is a cross section showing one step of the process.
Figure 3:
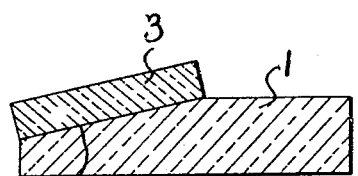
Fig. 3 is a cross section showing an additional step in the process.
Figure 4:
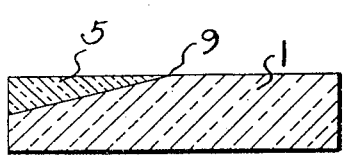
Fig. 4 is a cross section showing still another step of the process and the completed lens blank.
Figure 5:
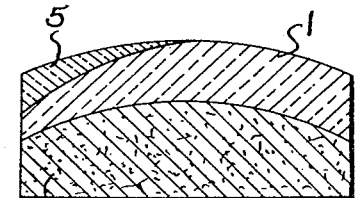
Fig. 5 is a cross section of the lens blank and molding block showing still another step of the process.
Figure 6:
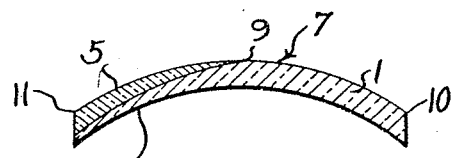
Fig. 6 is a cross section of the completed lens.

Referring to the drawing wherein similar reference characters denote corresponding parts throughout, I have taken for my example an aviator's goggle lens which is shown in plan view in Fig. 1 and in cross section in Fig. 6. In making this lens I first take a block of clear glass, such as crown glass 1, as indicated in Fig. 2 and grind or otherwise take off a prism shape 2 indicated by dot and dash lines in Fig. 2. I next finish off a block of glass 3 as shown in Fig. 3 of greenish color, preferably containing ferrous iron which has the property of transmitting the visible rays of light and of retarding the heat rays. This block of glass is finished preferably into rectangular form as shown in Fig. 3 and fused onto the block 1 along the line 4 thereof, as indicated in Fig. 3, the line 4 being the line formed by cutting off the prism 2 of Fig. 2. I next grind or finish off the block 3 to the wedge shape prism 5 shown in Fig. 4, which gives me a clear glass portion 1 with the prism or wedge shape colored prism 5 fused thereon. This produces my improved blank for the lens which blank has a clear portion and a clear portion overlaid with a wedge shaped colored portion as indicated in Fig. 4. I then place the fused block or lens blank of Fig. 4 on a refractory molding block 6 made of fire-clay, corundum or other refractory material and apply heat thereto preferably in a furnace until the fused piece of glass or lens blank drops down and takes the curve of the molding block as indicated in Fig. 5, thus forming a concavo-convex blank. I next grind, surface, finish and polish the surface 7 of the concavo-convex blank to a lens surface as indicated in Fig. 6 and then surface, grind, finish and polish the surface 8 of the blank as indicated in Fig. 6 to a lenticular surface. The surfaces 7 and 8 may be so made as to produce a plano or no power lens, or the surfaces may be made to include any prescription power of the lenses in accordance with the usual prior art method of producing such power lenses.

It will be noted from the foregoing description that by producing a lens of this character with my process I obtain several advantages. In the first place the block 3 of colored glass is usually formed of a glass that is very expensive; therefore, it is desirable to use just a small slab of the colored glass and to waste just as little as possible in grinding off the surfaces of the finished lens.

It is also apparent that in passing from the colorless to the colored portion to produce an increasing depth or density of shade that the two colors must blend imperceptibly and this will happen at the point 9, Figs. 4 and 6, being brought about by the way I proceed in making the blank.

Another advantage I obtain is that prior to dropping or molding the blank to its concavo-convex form I am able to proceed with flat or straight surfaces which are simpler to work and not so expensive.

It will be noted in Fig. 6 that the section of the glass is colorless from the point 10 to the point 9 and from the point 9 to the point 11 increases in density of shade owing to the colored prismatic segment 5.

While I have described the manufacture of a lens using only two colors, namely white and green, it is clear that any desired colors may be used and that a plurality of colors instead of two may be used if desired, the process being a continuation of that shown and described above. It has been found that such a lens is very desirable for aviators and for automobile drivers as the eye of the wearer may be shielded from intense light and glares as from the sun or headlights, simply by bowing the head to interpose the shaded portion of the lens between the eye and the light and the amount of density is controllable by the amount the head is bowed.

From the foregoing description it will be seen that I have provided simple, efficient and economical means for manufacturing a lens possessing all of the desired advantages and have produced a new and desirable lens blank for the manufacture of such lenses.

Having described my invention, I claim:

1. The process of making a shaded lens comprising forming on a base block of clear glass two surfaces, the second inclined at an angle to the first, placing a block of colored glass on the inclined surface of the base block, and cutting said colored glass block down to the plane of said first surface.

2. The process of making a shaded lens comprising forming on a base block of clear glass two intersecting surfaces, the second inclined at an angle to the first, placing a block of colored glass on the inclined surface of the base block so as to extend over the line of intersection of said surfaces, and cutting said colored glass block down to the plane of said first surface.

3. The process of making a shaded lens comprising preparing a base block of clear glass with at least one substantially plane optical surface, cutting away a portion of said block on a second plane inclined at an angle to and intersecting the first thus forming a second plane surface, securing to said second plane surface a block of colored glass of greater dimensions than the portion of clear glass cut away, and cutting said colored glass block down to the plane of said first surface, leaving one portion of the remaining block clear and the other portion comprised of the base portion of clear glass and the overlying portion of colored glass, said colored glass being of wedge shape.

HARRY W. HILL.